(12) United States Patent  
Provitola (10) Patent No.: US 8,531,507 B2
(45) Date of Patent: Sep. 10, 2013

(54) ENHANCEMENT OF VISUAL PERCEPTION IV

(76) Inventor: Anthony Italo Provitola, DeLand, FL (US)

(*) Notice: Subject to any disclaimer, the term of this patent is extended or adjusted under 35 U.S.C. 154(b) by 951 days.

(21) Appl. No.: 11/873,389

(22) Filed: Oct. 16, 2007

(65) Prior Publication Data

US 2009/0096983 A1   Apr. 16, 2009

(51) Int. Cl.
*H04N 9/47* (2006.01)
*H04N 13/04* (2006.01)

(52) U.S. Cl.
USPC .................................................. 348/53

(58) Field of Classification Search
USPC .............................. 382/154; 348/53
See application file for complete search history.

(56) References Cited

U.S. PATENT DOCUMENTS

| | | | |
|---|---|---|---|
| 2,679,188 A | 5/1954 | Gould | |
| 2,943,964 A | 7/1960 | Goldenberg | |
| 3,421,233 A * | 1/1969 | Gaal | 434/178 |
| 3,582,961 A | 6/1971 | Shindo | |
| 3,701,581 A | 10/1972 | Henkes | |
| 4,517,558 A | 5/1985 | Davids | |
| 4,633,322 A | 12/1986 | Fourny | |
| 4,819,085 A | 4/1989 | Liang | |
| 5,172,266 A | 12/1992 | Garcia et al. | |
| 5,257,130 A | 10/1993 | Monroe | |
| 5,291,330 A | 3/1994 | Daniels | |
| 5,424,786 A * | 6/1995 | McCarthy | 351/46 |
| 5,488,510 A | 1/1996 | LeMay | |
| 5,510,832 A | 4/1996 | Garcia | |
| 5,541,642 A | 7/1996 | Ashbey | |
| 5,556,184 A | 9/1996 | Nader-Esfahani | |
| 5,751,927 A | 5/1998 | Wason | |
| 5,806,218 A | 9/1998 | Shanks et al. | |
| 5,886,771 A | 3/1999 | Osgood | |
| 5,976,071 A * | 11/1999 | Sekiya | 600/111 |
| 6,414,681 B1 | 7/2002 | Ohshima et al. | |
| 6,530,662 B1 | 3/2003 | Haseltine et al. | |
| 6,536,146 B2 | 3/2003 | Ericson | |
| 6,595,636 B2 * | 7/2003 | Zolten | 351/160 R |
| 6,742,892 B2 | 6/2004 | Liberman | |
| 6,929,369 B2 | 8/2005 | Jones | |
| 7,073,908 B1 | 7/2006 | Provitola | |
| 7,086,735 B1 | 8/2006 | Provitola | |
| 2005/0052617 A1 | 3/2005 | Fujikawa et al. | |
| 2005/0206582 A1 | 9/2005 | Bell et al. | |

* cited by examiner

*Primary Examiner* — Joseph Ustaris
*Assistant Examiner* — Anner Holder (57) ABSTRACT

A device and method for enhancement of a viewer's visual perception in a real physical (three spatial dimension) scene and/or a single two-dimensional image, which includes enhancement of a viewer's depth perception and perception of clarity in the real physical scene and/or the two-dimensional image, by alteration of a viewer's eye dominance with direction of greater attention to the viewer's non-dominant eye for contribution to the binocular view.

20 Claims, 11 Drawing Sheets

ENHANCEMENT OF VISUAL PERCEPTION IV

CROSS-REFERENCE TO RELATED APPLICATIONS

U.S. Non-provisional application Ser. No. 11/033,186 entitled ENHANCEMENT OF DEPTH PERCEPTION filed on Jan. 11, 2005; U.S. Provisional Application No. 60/685,737 entitled ENHANCEMENT OF DEPTH PERCEPTION filed on May 27, 2005; U.S. Non-provisional application Ser. No. 11/222,733 entitled ENHANCEMENT OF VISUAL PERCEPTION filed on Sep. 10, 2005; Patent Cooperation Treaty Application No. PCT/US2005/047577 entitled ENHANCEMENT OF VISUAL PERCEPTION with International filing date of Dec. 31, 2005; U.S. Provisional Application No. 60/799,886 entitled ENHANCEMENT OF VISUAL PERCEPTION II filed on May 12, 2006; U.S. Non-provisional application Ser. No. 11/735,136 entitled ENHANCEMENT OF VISUAL PERCEPTION II filed on Apr. 13, 2007; Patent Cooperation Treaty Application No. PCT/US2007/067676 entitled ENHANCEMENT OF VISUAL PERCEPTION II with International filing date of Apr. 27, 2007; U.S. Provisional Application No. 60/799,817 entitled ENHANCEMENT OF VISUAL PERCEPTION III filed on May 12, 2006; U.S. Non-provisional application Ser. No. 11/735,459 entitled ENHANCEMENT OF VISUAL PERCEPTION III filed on Apr. 14, 2007; Patent Cooperation Treaty Application No. PCT/US2007/067685 entitled ENHANCEMENT OF VISUAL PERCEPTION III with International filing date of Apr. 27, 2007.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The field of the invention pertains to systems, devices, and methods for enhancing the visual perception of a viewer with binocular vision in a real physical (three spatial dimension) scene and/or a two-dimensional image, which includes enhancement of the viewer's perception of depth and clarity.

The use of the terms "two-dimensional", "monoscopic", and "monocular" have been used in the prior art to distinguish the viewing of single images from that which is "stereoscopic"—the quality of vision with which a human viewer with two normal eyes and the ability for stereopsis sees a scene in real physical (three spatial dimension) space with objects at varying distances from the viewer. However, some clarification of these terms is necessary: the term "two-dimensional" as an adjective for the term "image" does not mean that the image does not represent a three-dimensional scene, i.e. a scene with visual cues for depth related to objects and surfaces at varying distances within the perspective and other monocular depth cues of the scene; the term "three-dimensional" or "3D" as applied to an image does not necessarily mean that it is stereoscopic, but may also mean that it is an image displayed on a two-dimensional surface, flat or curved, and/or which may be manipulated so that the objects represented therein are viewable at different angles and distances, either by rotation of the object or the variation in the angle of view with an apparent change in position of the viewer; the term "monocular", which literally means "having only one eye" or "with one eye" (in contrast with "binocular", meaning with two eyes), sometimes used as a synonym for "two-dimensional", is used herein to describe an image which appears to be displayed on a two-dimensional surface (as when a physical scene of objects at varying distance from the viewer is viewed with one eye), and is also used in the prior art terms "monocular cues" and "monocular depth cues" to describe certain aspects of a two-dimensional display of a three-dimensional scene which indicate the varying distances and angles of objects with reference to the view represented therein; the term "monoscopic" appears to be used in some prior art as a synonym for "monocular", but is not defined as such in common usage.

The subject of "depth perception of images on a television screen" has been discussed in LeMay, U.S. Pat. No. 5,488,510, but not the subject of depth perception in other types of two-dimensional images, such as posters, paintings, signs, still photographs, cinema, etc., or the subject of enhancement of depth perception in real physical (three spatial dimension) scenes. LeMay uses a window screen type mesh in a device to be worn by a viewer through which a two-dimensional television image is viewed, and creates, according to its inventor, an "illusion". The present invention, in its preferred embodiments, may also use a type or modification of eye wear or worn device, but provides a natural stereo vision experience in the viewing of two-dimensional images of all kinds, including photographs, posters, drawings and paintings, signs, television and motion pictures, and projected images in general, and an enhanced stereo vision in viewing real physical (three spatial dimension) objects and scenes. Unlike LeMay, however, with the present invention the viewer's area of attention in that which is viewed directly is not obscured by a mesh, grid, screen, or any other object. The term "area of attention" is used here to mean the whole or part of a 2D image or real physical scene (which may include a 2D image) that a viewer is focused upon and includes the viewer's point of fixation. Also unlike LeMay, the present invention does not rely upon an "illusion", but enhances the viewer's visual perception, including the perception of depth in the monocular depth cues and real physical (three spatial dimension) scenes and the perception of clarity in both.

The present invention should be distinguished from stereographic and autostereographic devices and methods providing stereoscopic vision which require simultaneous or alternated display of two images, still or motion picture, each image being of one of two monocular views, actual or simulated, of a binocular view of a scene, which must be viewed with special viewing glasses or display lens; whereas the present invention involves the viewing of a real physical (three spatial dimension) scene or display of only one image, still or motion picture, of a single monocular view of the scene. It is to be noted that the stereo vision provided by the prior art is artificial in appearance. Stereographic devices have been well known for many years, while some of the principles underlying the present invention are newly presented herein and have been newly presented in part by the present inventor in other United States patents issued to the present inventor, U.S. Pat. Nos. 7,073,908 and 7,086,735.

The present invention should also be distinguished from the well-known effect that is observed with monocular viewing of a two-dimensional image with monocular depth cues against a featureless or flat background without such cues. The same effect can also be observed by monocular viewing of a two-dimensional image at the end of an enclosed space. With such a viewing the monocular depth cues in a two-dimensional image become pronounced, albeit seen with only one eye. Such monocular viewing, however, not only involves the discomfort of a binocular viewer viewing with only one eye, but deprives the binocular viewer of the accommodation reflex which occurs with binocular vision that gives the viewer the ability to accurately focus on the two-dimensional image. The result is that although, with such monocular viewing, the monocular depth cues in a two-dimensional image have an effect greater than if viewed binocularly, the two-dimensional image cannot be seen with the same degree of focus as if seen binocularly. The present invention operates very differently: the viewer's depth perception and perception of clarity is enhanced by stimulating greater attention to the viewer's non-dominant eye for contribution to the binocular view. With the present invention all views can be seen binocularly with the accurate focus of the accommodation reflex. Such accurate focus in turn heightens the fusion experience, and thus the enhancement of depth perception and perception of clarity afforded by the present invention.

The classification that applies to this aspect of the invention is generally in U.S. Class 359, "OPTICAL: SYSTEMS AND ELEMENTS", but the only subclass titles that provide a verbal similarity are 462, "STEROSCOPIC", and 478, "RELIEF ILLUSION", the descriptions of neither being applicable to the theory of operability of the present invention.

The enhancement of clarity of the present invention should be distinguished from eye wear, lens systems, and surgical procedures for gaining improved focus of images on the retina, which are all well-known. Distinction should also be made between the present invention and eye exercise systems, discussed extensively in Liberman, U.S. Pat. No. 6,742,892 (along with an informative tract on eye anatomy, function and optics), which are primarily concerned with the improvement of eye tracking, convergence and accommodation. It is presumed that U.S. Class 359, "OPTICAL: SYSTEMS AND ELEMENTS" may apply to this aspect of the invention as well. U.S. Class 351, "OPTICAL: EYE EXAMINING, VISION TESTING AND CORRECTION" may also apply.

SUMMARY OF THE INVENTION

The present invention provides enhancement of a viewer's visual perception in a real physical (three spatial dimension) scene and/or a single two-dimensional image, which includes enhancement of the depth perception of a viewer in various types of two-dimensional images that include monocular cues for depth, and thereby the experience of stereo vision in the viewing by such enhancement of the viewer's perception of those monocular depth cues. Such an enhancement is effected by the present invention by alteration of a viewer's eye dominance with direction of greater attention to the viewer's non-dominant eye for contribution to the binocular view, thus intensifying the normal retinal disparity of stereoscopic vision experienced by a viewer as the fusion of retinally disparate images. Thus, the present invention intensifies the viewer's retinal disparity in viewing real physical (three spatial dimension) objects and scenes, and thereby the viewer's perception of, 1) depth in those physical objects and scenes; 2) depth in the monocular depth cues in a single two-dimensional image; and 3) the "clarity" with which the viewer perceives visually.

The present invention, being a device and method for stimulation of the viewer's visual system to give greater attention to the viewer's non-dominant eye, may be practiced in several ways, two of which are: 1) the first and preferred way, by obstructing a segment of the field of view of the viewer's dominant eye; and 2) the second way, by introducing an image element into or obstructing a segment of the field of view of the non-dominant eye.

DETAILED DESCRIPTION OF THE INVENTION

The present invention provides enhancement of binocular visual perception in the viewing of a real physical (three spatial dimension) object or scene, hereinafter referred to simply as a "physical scene", and/or a single two-dimensional image, hereinafter referred to as a "2D image", for a viewer with two eyes, including enhancement of the viewer's perception of depth and the perception of clarity. A physical scene may also include a physical object which is a "2D image". Such an enhancement is thought to be effected by the present invention by alteration of a viewer's eye dominance, that is, with direction of greater attention to the viewer's non-dominant eye for contribution to the binocular view. Such alteration of eye dominance appears to intensify the normal retinal disparity of stereoscopic vision experienced by a viewer with a normal capacity for stereopsis. The term "enhance" and all of the terms for which it is the stem as used herein, i.e. enhancement, enhancer, etc., are to be understood in this disclosure in their broadest sense to include the sense of all synonymous terms, such as intensify, boost, deepen, strengthen, reinforce, heighten, etc. With respect to the depth perception enhancement in a physical scene, the viewer's perception of depth is enhanced subtly but with definite strength, so that the perception of depth is compelling, and not casual as with normal viewing. With respect to depth perception enhancement in a 2D image, the present invention provides a viewer who has the capacity for stereopsis with the experience of stereo vision in the viewing of a 2D image by enhancing the viewer's perception of depth in the monocular depth cues in the 2D image. That is, the depth perception enhancement effect of the present invention so enhances the viewer's perception of the monocular depth cues in a 2D image as to cause the viewer to experience the fusion of stereoscopic vision with respect to the content of that 2D image. With respect to the clarity enhancement, the present invention provides a viewer with enhancement of the viewer's perception of clarity in viewing a physical scene and/or a 2D image, even without the presence of monocular depth cues in the 2D image.

The experience of stereo vision provided by the present invention for 2D images is superior to the prior art in that the cyclopean images experienced with the present invention do not suffer from the defects described in the prior art, but are as natural as normal stereoscopic vision to the viewer. The experience is natural because it is with the viewer's own eye separation and capacity for stereopsis. Moreover, with the present invention all views can be seen binocularly with the accurate focus of the accommodation reflex. Such accurate focus in turn heightens the fusion experience, and thus the enhancement of depth perception and perception of clarity afforded by the present invention. The term "clarity" is used herein to mean the resolution with which a physical scene and/or a 2D image is perceived by the viewer, and not the viewer's focus on the two-dimensional image.

The effect of these enhancements shall hereinafter be referred to as the "enhancement effect". However, the enhancement effect being threefold, the aspects thereof shall be referred to as the "PS enhancement" for the depth perception enhancement in a physical scene, the "2D enhancement" for the depth perception enhancement in a 2D image, and the "clarity enhancement" when the distinction is necessary. Otherwise, the term "enhancement effect" should be understood to mean any one or all of the aspects, depending on the context.

A 2D image is referred to as such because it is substantially representable using coordinates of only two dimensions, regardless of the shape of the surface upon which it exists, such as an embossed surface, having a discernable texture, or the surface of a relief. A 2D image may be of any kind, including photographs, posters, drawings, paintings, signs, television and computer images; and all forms of front and rear projection images, film or electronic, both still and motion; however viewed, either directly or by other means; or whether generated or displayed mechanically, optically, or electronically. The term "2D image" as used in this disclosure may represent a three-dimensional scene, which is a scene with one or more monocular depth cues related to objects and/or surfaces at varying apparent distances from the viewer. A 2D image need not have any monocular depth cues in order for it to be viewed with the clarity enhancement effect; but in order to be viewed with the 2D enhancement where not representing a three-dimensional scene, the 2D image must have at a minimum some monocular depth cue, even if only contrived for that purpose. The term "monocular", which literally means "having only one eye" or "with one eye", is not used in this disclosure as a synonym for "two-dimensional" as used in the term "2D image", and is specifically excluded from the meaning of "2D image" as used in this disclosure. However, the common meaning of "monocular" is used in this disclosure to describe an image of a physical scene of objects at varying distance from the viewer when viewed with one eye (and thereby may appear to be displayed on a two-dimensional surface), as well as with reference to "monocular cues" or "monocular depth cues".

The surface upon which a 2D image is presented shall be referred to as the "image surface", which may be flat, faceted, horizontally and/or vertically curved, spherical, some other shape, or as previously discussed herein, and may be a surface which is not associated with a solid physical object, such as a sheet flow, spray of liquid, or cloud of vapor; or may be a surface defined by the 2D image in physical space not associated with any physical object at all. An object upon which an image surface may be displayed or otherwise exist shall hereinafter be referred to as an "image object", and may be solid, liquid or gaseous.

For the purpose of this disclosure the term "horizontal", as referred to herein in its other forms (such as "horizontally" as used hereinabove), shall mean a direction substantially parallel to the orientation of the viewer's eyes, i.e. in the direction of the line joining the center of the viewer's eyes, even though not horizontal in relation to the earth's surface; or the direction of a component of the distance vector between two points in space (from the vector representation of location, wherein the distance vector of a location is resolved into two component distance vectors at right angles, the magnitude of the resolved vector being the magnitude of the hypotenuse of the right triangle formed by the resolved distance vector with its components), which is substantially parallel to the orientation of the viewer's eyes.

The term visual system shall be taken to mean the human visual system, including the eyes and all of their internal structures, the optic nerves, all neural structures associated with all other functions of eye movement, protection, or control; and all neural structures by which data collected by the eyes is processed, recorded and interpreted, including the human brain, particularly the visual cortex.

As a foundation for understanding the invention and the nature of the enhancement effect, the following generally accepted definitions and principles related to the human visual system and visual perception may be considered:

1. Accomodation reflex: The reflexive activity of the human visual system whereby adaptation of the eyes occurs to facilitate focusing, including the increase in the curvature of the lenses and pupilary constriction, in response to convergence of the eyes in fixation on a target object.
2. Point of Fixation (Point of Regard): Point or object on which the eyes are directed and one's sight is fixed.
3. Fovea: Point on the retina on which are focused the rays coming from an object directly regarded, i.e. from the point of regard.
4. Monocular depth cues: Visual cues which present information about the relative location of objects using one eye, which include: occlusion or interposition; aerial perspective (atmospheric perspective, aerial haze); linear perspective (convergence of parallel lines); relative height; texture gradients; shading and light; relative size; relative motion (monocular movement parallax); and familiar size.
5. Retinal disparity: Differences between two or more images projected on the retina of the eye with reference to the fovea of the retina; the difference in the retinal images that results from retinally disparate points of retinal images detected in the visual cortex which, if within Panum's fusional area (zone of single binocular vision), can be fused resulting in single vision.
6. Fusion: Neural process commonly referred to as stereoscopic vision (or stereo vision), thought to occur in the visual cortex, that brings two retinal images to form a single image which is known as the single cyclopean image.
7. Panum's fusional region (Panum's fusional space): Region in visual space over which humans perceive binocular single vision derived from the fusion of binocular retinal images. (Outside Panum's fusional region physiological diplopia occurs.)
8. Panum's fusional area: Area on the retina of one eye, any point on which, when stimulated simultaneously with a single specific slightly disparate point in the retina of the other eye, will give rise to a single fused image.
9. Retinally disparate points: Retinal points which can give rise to different principal visual directions, which, when within Panum's fusional area (zone of single binocular vision), can be fused resulting in single vision.
10. Retinally disparate images: Retinal images which are comprised of retinally disparate points.
11. Stereopsis: Ability to perceive depth produced by retinal disparity within Panum's fusional area requiring properly functioning binocular cells thought to exist in the visual cortex: the ability to distinguish the relative distance of objects resulting from the lateral displacement of the eyes that provides two slightly different views of the same object (disparate images).
12. Binocular retinal rivalry: Alternating suppression of the two eyes resulting in alternating perception of the two retinal images.
13. Visual field: The angular width of space that may be visually observed from the eye of a human viewer, normally 145 to 155 degrees.
14. Field of view: The angular width of space that may be visually observed by a human viewer with two eyes and normal visual fields, normally 180 to 190 degrees.
15. Binocular field of view: The angular width of space within the overlap of the visual fields of a human viewer with two eyes and normal visual fields, normally 120 to 140 degrees.

The present invention in its various embodiments comprises a device and a method for the stimulation of the viewer's visual system to give greater attention to the viewer's non-dominant eye in various ways, the result of which may be hereinafter referred to as the "altered view". The altered view is thus considered in this disclosure to be the visual state in which the viewer's perception of clarity and depth in the physical scene 22 is enhanced. Two of such ways are: 1) the first and preferred way, by introducing an element into the field of view of the viewer's dominant eye which obstructs a segment of that field of view which is at least partially in the field of view of the viewer's non-dominant eye; and 2) the second way, by introducing an element into the field of view of the viewer's non-dominant eye that projects an additional image in the view of the non-dominant eye which is not within the field of view of the viewer's dominant eye. Both of these ways may be employed at the same time. These ways may be effected mechanically, electronically, and optically, or by a combination of such means. The currently preferred way is the first, and the element introduced into the field of view of the dominant eye shall be referred to hereinafter as an "obstructor". An obstructor is a device positioned in the field of view of a viewer's eye which alters the view of the viewer by obstructing the visual field of view of the eye to some degree. The element of the second way shall be referred to hereinafter as an "image element". An image element may be incorporated in an obstructor.

An image element may appear as an artifact within the area of interest to the viewer in the viewer's binocular field of view. Such an artifact is an invitation to the visual system to depart from proper eye convergence and the accommodation reflex with the consequent loss of focus of the area of interest in the physical scene or the two-dimensional object being viewed. The second way, however, may have utility where such an artifact does not detract from the viewer's purpose.

The theoretical foundation for the enhancement effect is thus based in part upon the phenomena of eye dominance in the human visual system, i.e., the dominant eye more strongly contributes to binocular vision than the other eye, and is said to be the eye that looks directly at an object; and the phenomena of binocular retinal rivalry, i.e., alternating perception of the two retinal images—indicating that the retinal image from only one eye at a time is being neurally recorded in the visual cortex. If it is the fusion of slightly disparate retinal images in the visual cortex that provides the experience of stereoscopic vision, then a diminution of the strength of one of such images in the visual cortex must diminish the experience. Therefore, if one eye is dominant, greater contribution by the non-dominant eye, with greater attention to binocular vision, may be required for a full perception of binocular depth cues. Such enhancements are effected by the present invention with the stimulation of an increase in the contribution of the non-dominant eye to the cyclopean image, and a consequent alteration of eye dominance and intensification of the effect of retinal disparity on the Panum's fusional area of the viewer.

Further understanding of the present invention and its underlying principle may be had with reference to the drawings of the embodiments shown in FIGS. 1-24. In the various figures it should be noted that the reference numerals for certain elements of the system are the same throughout the drawings where the function of such elements remains the same. FIGS. 1-4 show the preferred embodiment in four views with an obstructor 2 for each eye 3 mounted in a device 1 which is a frame that attaches at the nose bridge to the viewer's eye glasses 4. Similarly FIGS. 5-8 show the secondary embodiment, but with an image element 2 or obstructor 2, there being no difference in the illustration thereof FIGS. 9-12 similarly show the device 1 with a slightly smaller obstructor 2, and FIGS. 13-16 similarly show the device 1 with a slightly wider image element 2 or obstructor 2. FIGS. 17-20 show the device 1 as and incorporated in eyeglasses or eyeglass frames 4, there being no difference in the illustration thereof, with the various obstructors 2 and image elements 2, and FIGS. 21-24 show the device 1 as a frame 4 in which the various obstructors 2 and image 2 elements may be mounted so as to be horizontally adjustable to widen or narrow the area of attention 8 shown in FIGS. 25-28. As previously indicated, the term "area of attention" is used herein to mean the whole or part of a 2D image 23 or physical scene 22 that a viewer is focused upon and includes the viewer's point of fixation.

Figure 1:
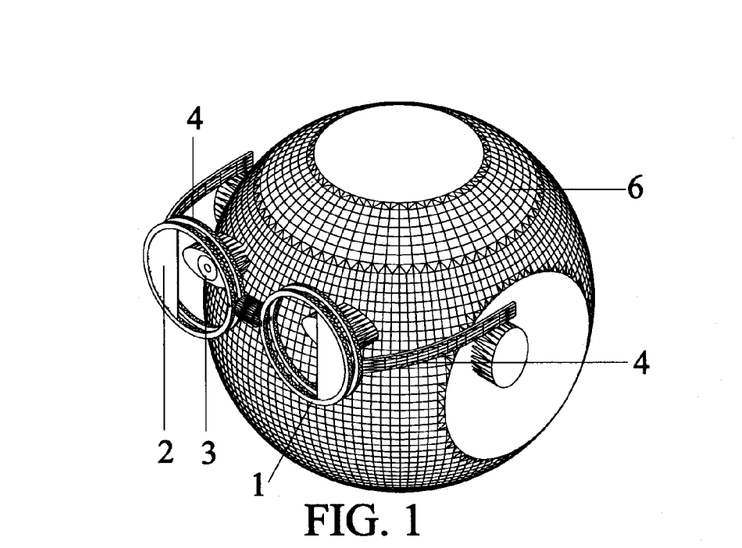
FIG. 1 is a perspective view of the preferred embodiment of the device in a frame attached to eye glasses worn by a viewer.
Figure 2:
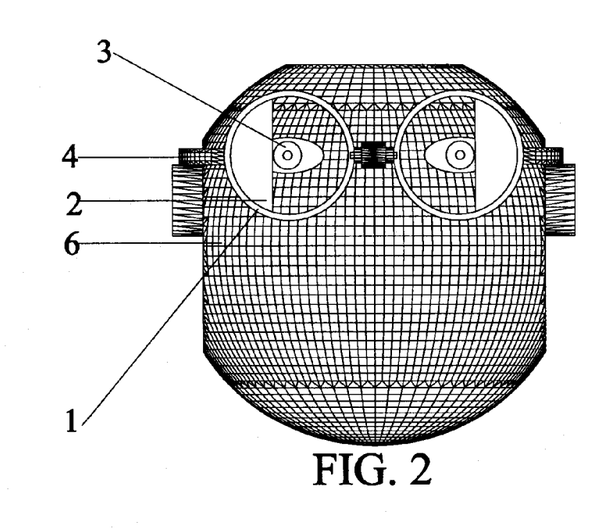
FIG. 2 is a front view of the preferred embodiment of the device shown in FIG. 1.
Figure 3:
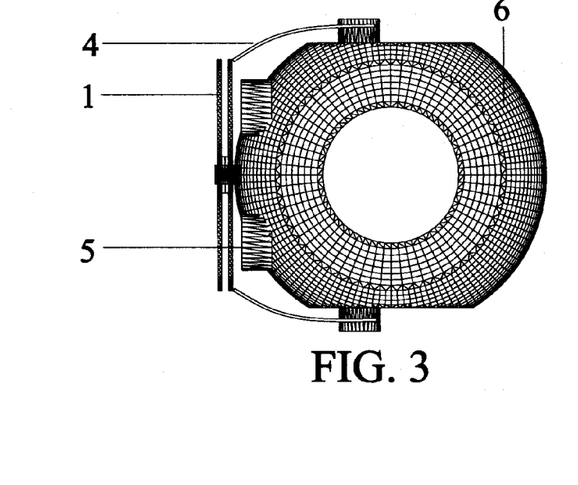
FIG. 3 is a top view of the preferred embodiment of the device shown in FIG. 1.
Figure 4:
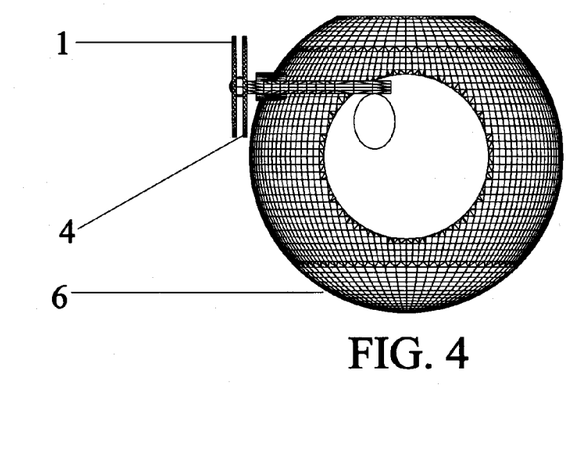
FIG. 4 is a side view of the preferred embodiment of the device shown in FIG. 1.
Figure 5:
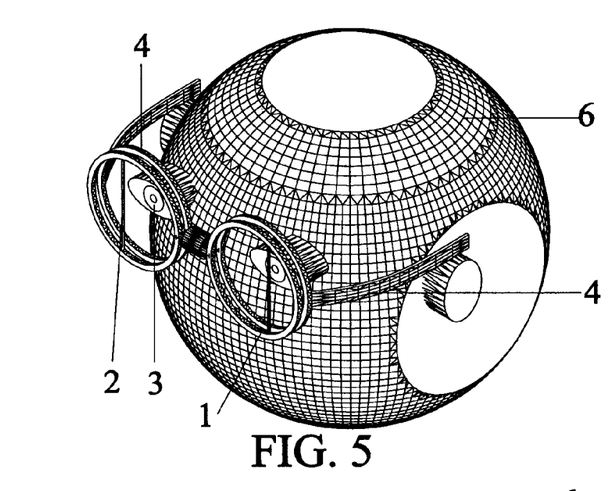
FIG. 5 is a perspective view of the secondary embodiment of the device in a frame attached to eye glasses as worn by a viewer.
Figure 6:
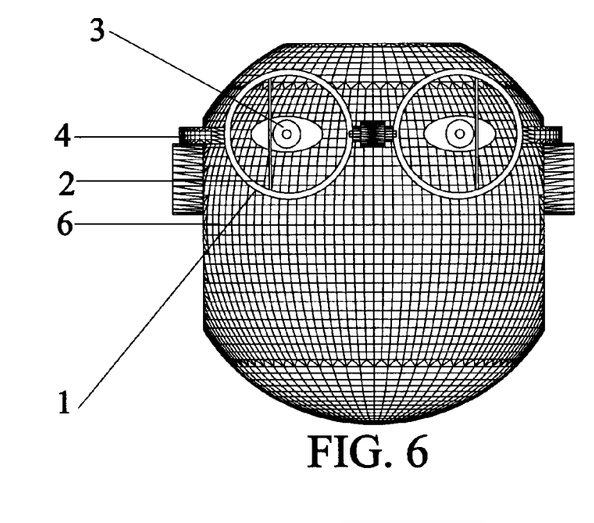
FIG. 6 is a front view of the secondary embodiment of the device shown in FIG. 5.
Figure 7:
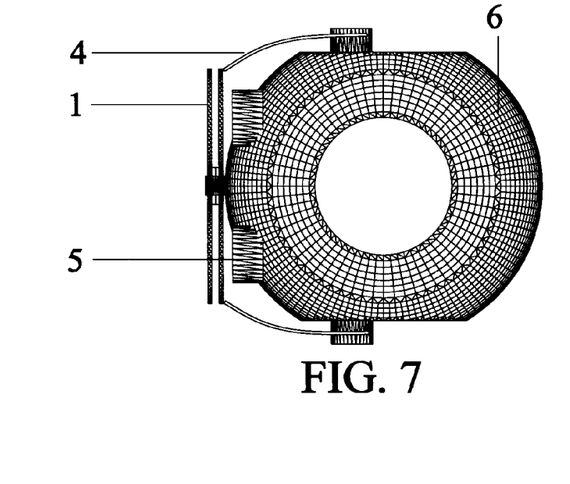
FIG. 7 is a top view of the secondary embodiment of the device shown in FIG. 5.
Figure 8:
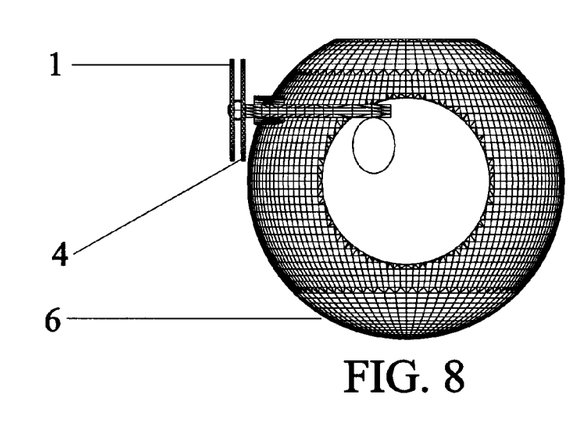
FIG. 8 is a side view of the secondary embodiment of the device shown in FIG. 5.
Figure 9:
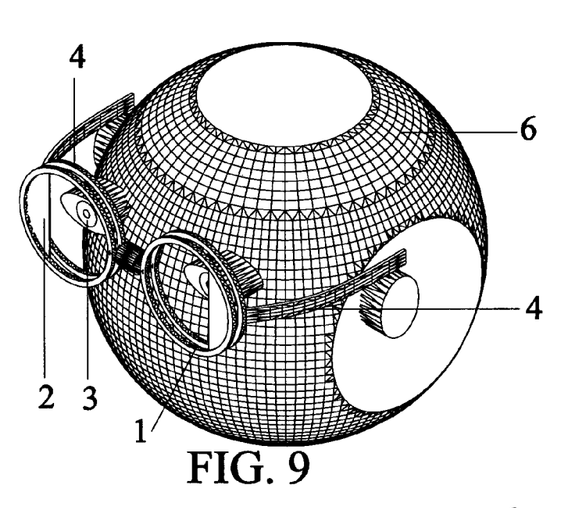
FIG. 9 is a perspective view of the preferred embodiment of the device shown in FIG. 1 with a smaller obstructor.
Figure 10:
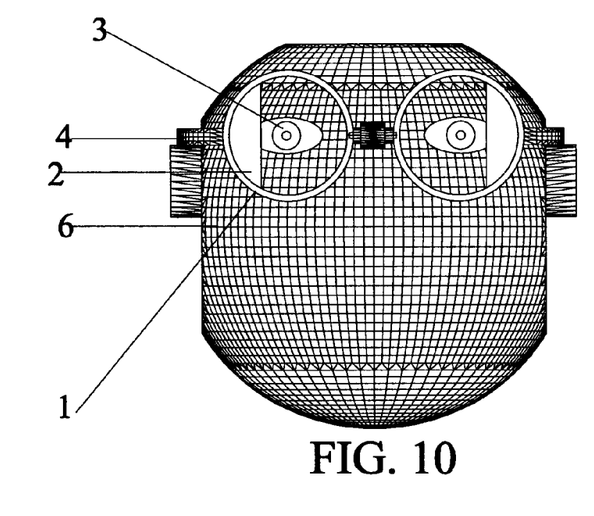
FIG. 10 is a front view of the preferred embodiment of the device shown in FIG. 9.
Figure 11:
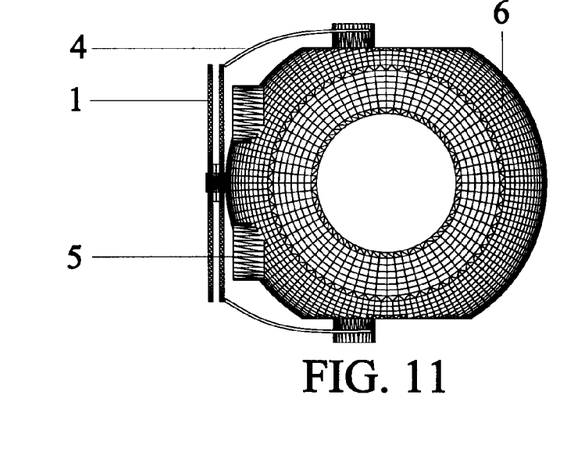
FIG. 11 is a top view of the preferred embodiment of the device shown in FIG. 9.
Figure 12:
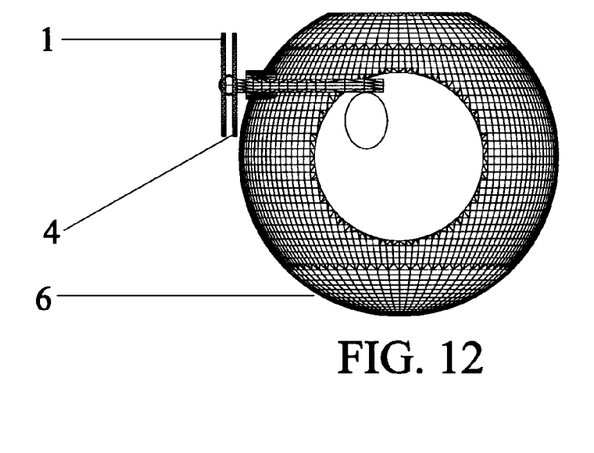
FIG. 12 is a side view of the preferred embodiment of the device shown in FIG. 9.
Figure 13:
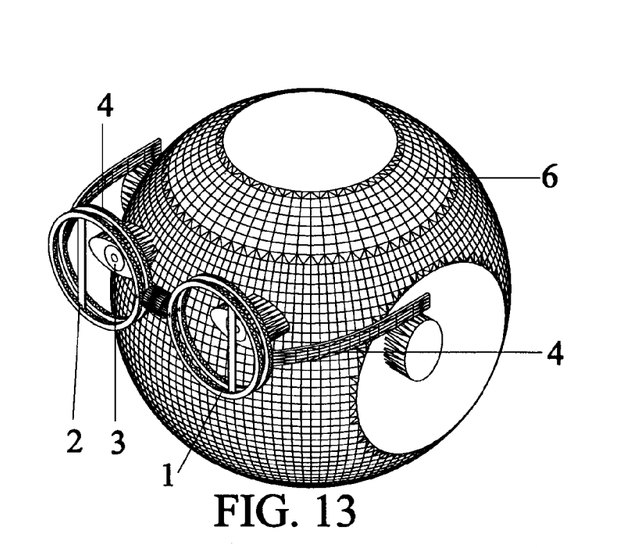
FIG. 13 is a perspective view of the secondary embodiment of the device shown in FIG. 5 with a wider image element.
Figure 14:
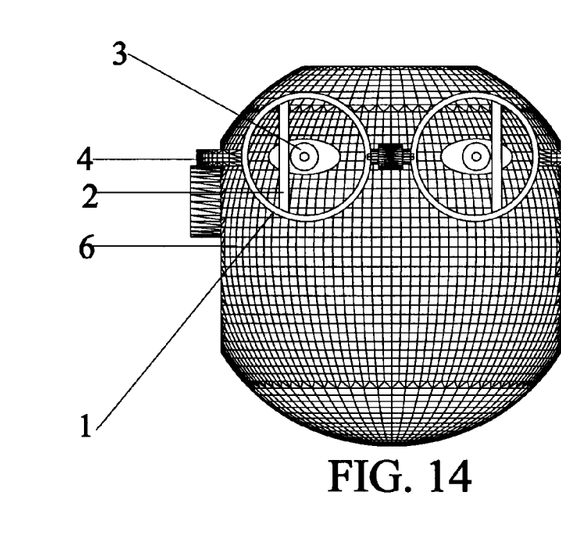
FIG. 14 is a front view of the secondary embodiment of the device shown in FIG. 13.
Figure 15:
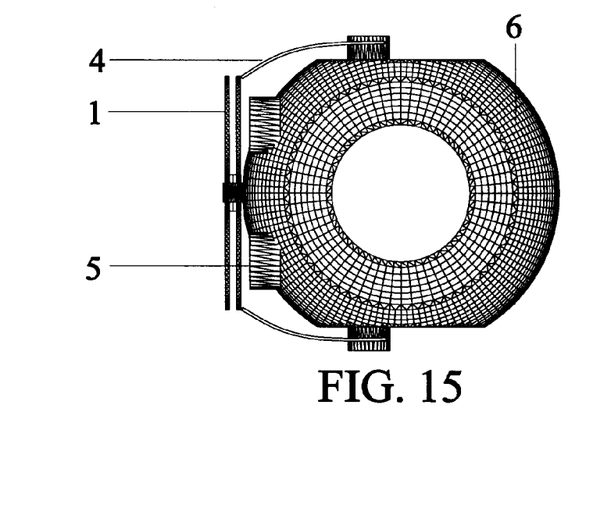
FIG. 15 is a top view of the secondary embodiment of the device shown in FIG. 13.
Figure 16:
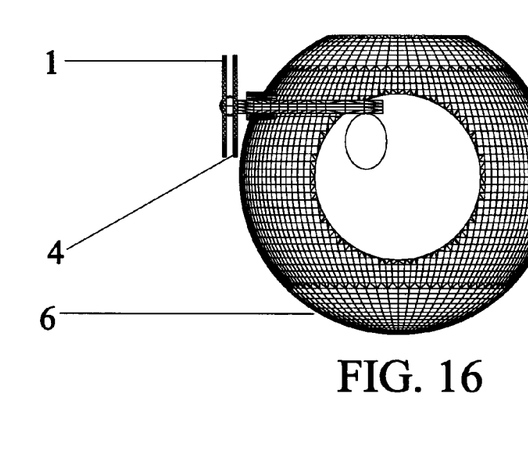
FIG. 16 is a side view of the secondary embodiment of the device shown in FIG. 13.
Figure 17:
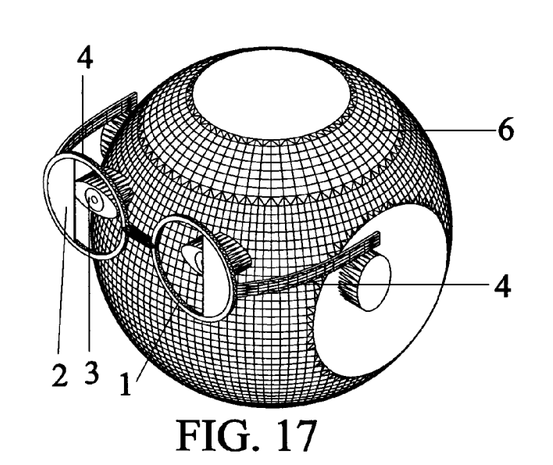
FIG. 17 is a perspective view of the preferred embodiment of the device incorporated in eye glasses worn by a viewer.
Figure 18:
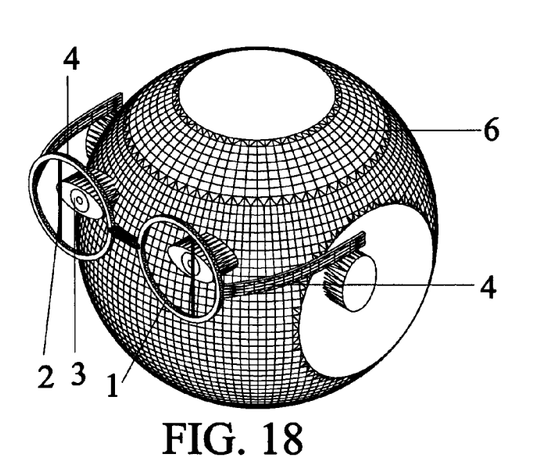
FIG. 18 is a perspective view of the secondary embodiment of the device incorporated in eye glasses worn by a viewer.
Figure 19:
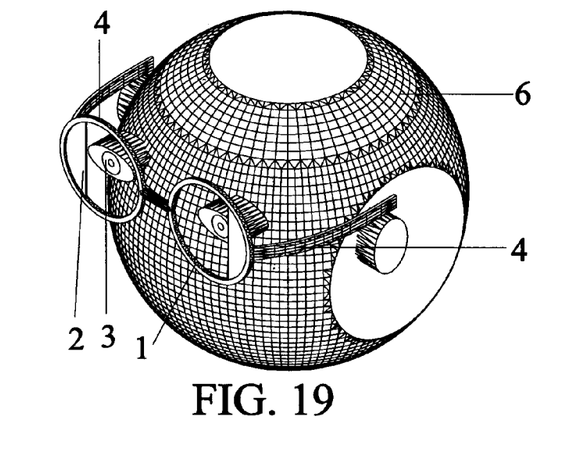
FIG. 19 is a perspective view of the preferred embodiment of the device shown in FIG. 17 with a smaller obstructor.
Figure 20:
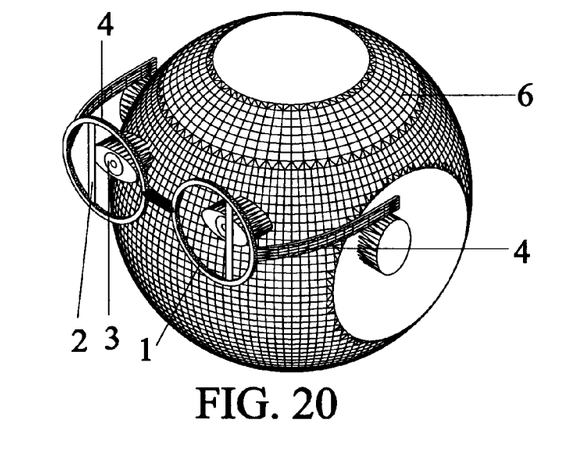
FIG. 20 is a perspective view of the secondary embodiment of the device shown in FIG. 18 with a wider image element.
Figure 21:
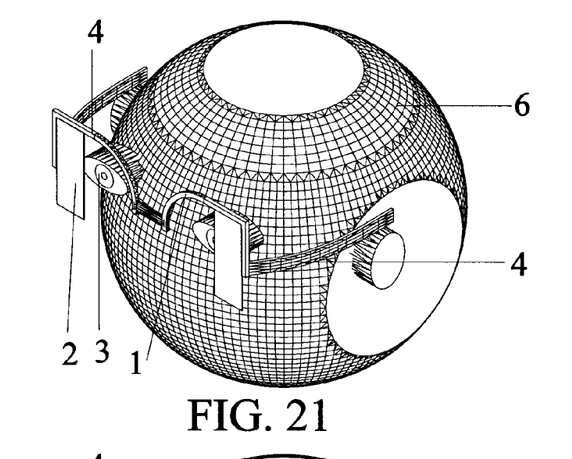
FIG. 21 is a perspective view of the preferred embodiment of the device with open frames and a position adjustable obstructor as worn by a viewer.
Figure 22:
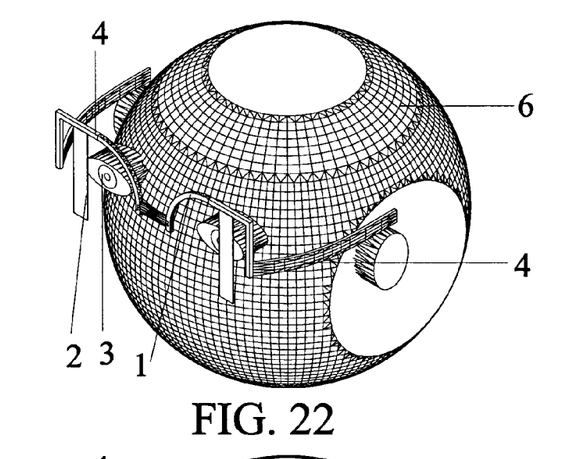
FIG. 22 is a perspective view of the preferred embodiment of the device shown in FIG. 21 with a smaller position adjustable obstructor.
Figure 23:
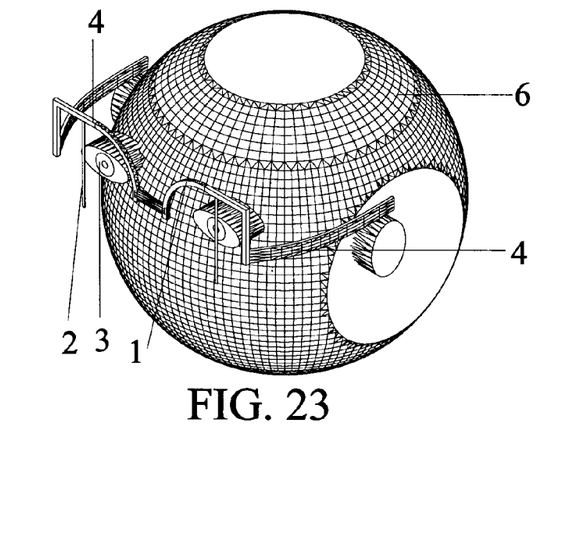
FIG. 23 is a perspective view of the secondary embodiment of the device with open frames and a position adjustable image element as worn by a viewer.
Figure 24:
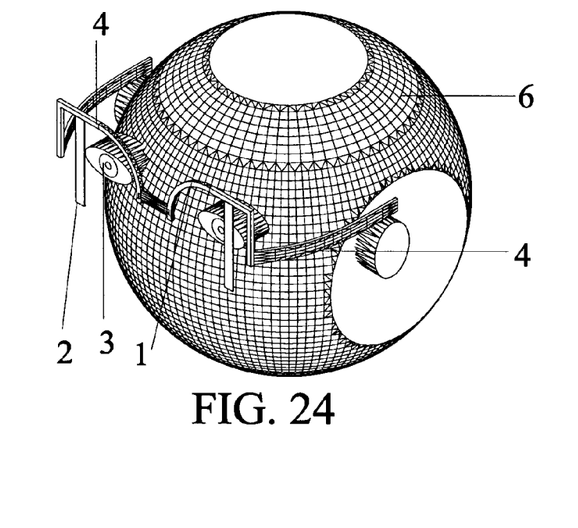
FIG. 24 is a perspective view of the secondary embodiment of the device shown in FIG. 23 with a wider position adjustable image element.
Figure 25:
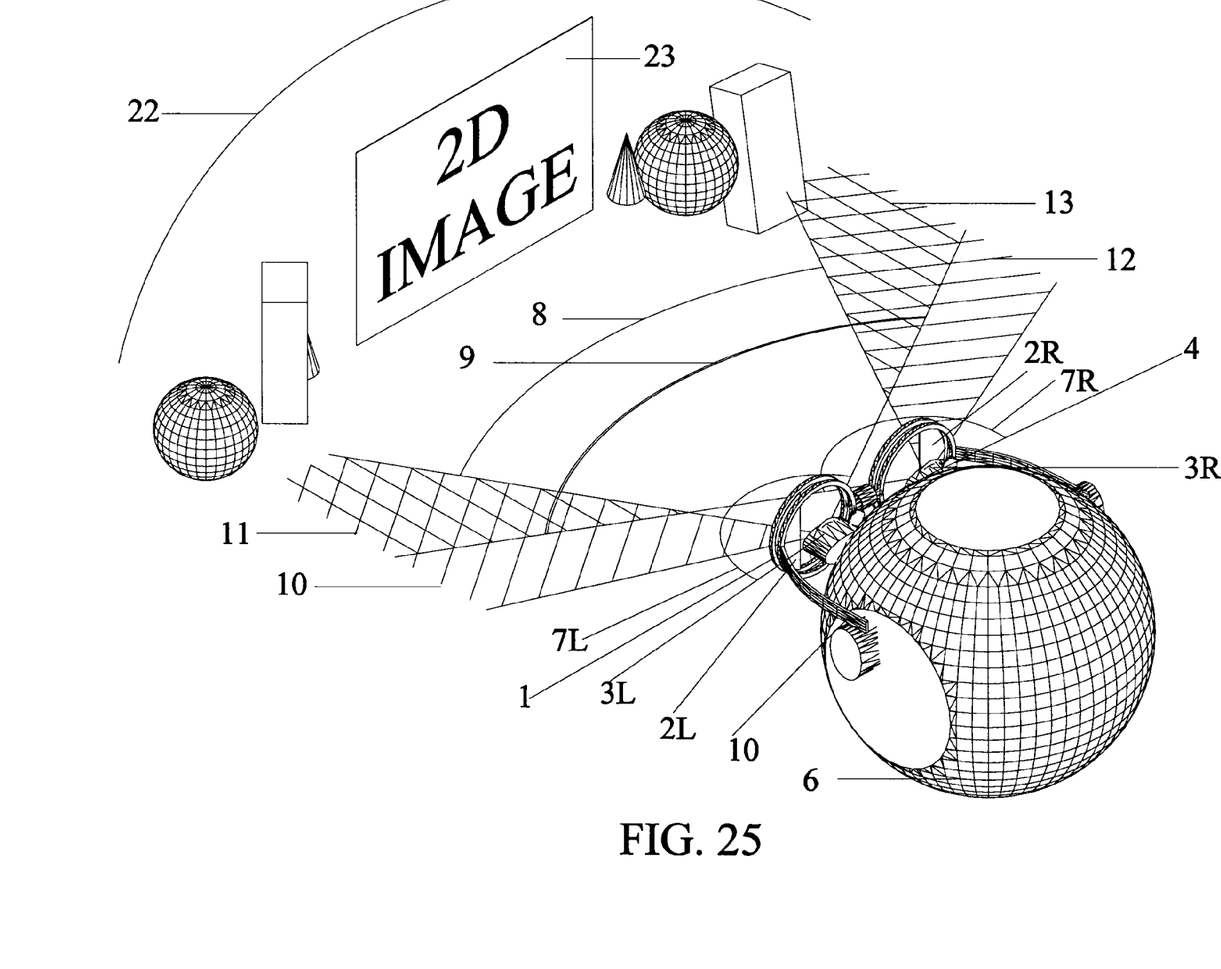
FIG. 25 is a perspective view of the effect on the visual fields of a viewer with the use of the preferred embodiment of the device shown in FIGS. 1-4, 9-12, 17, 19, 21 and 22.
Figure 26:
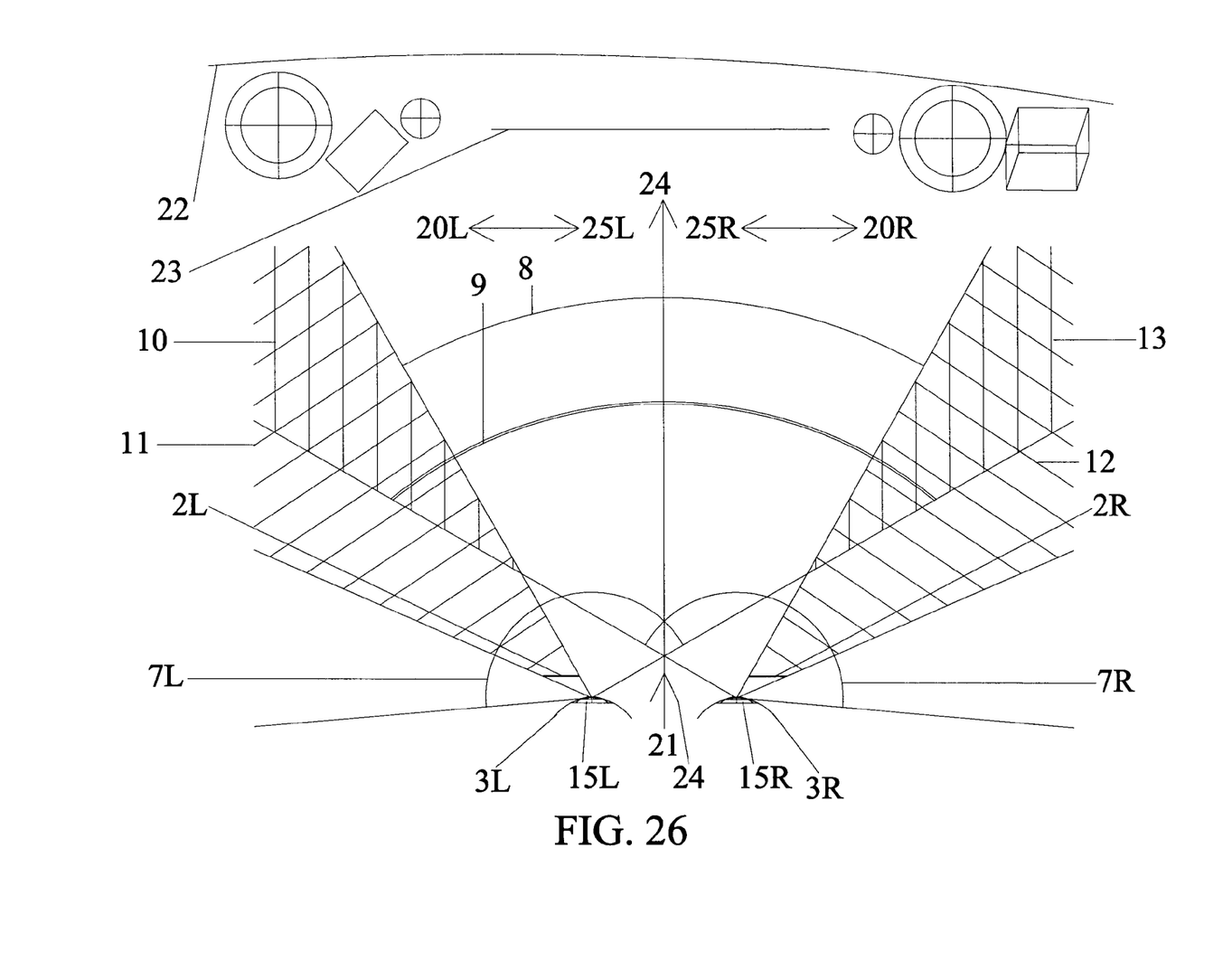
FIG. 26 is a schematic plan (top) view of the effect on the visual fields of a viewer shown in FIG. 25.
Figure 27:
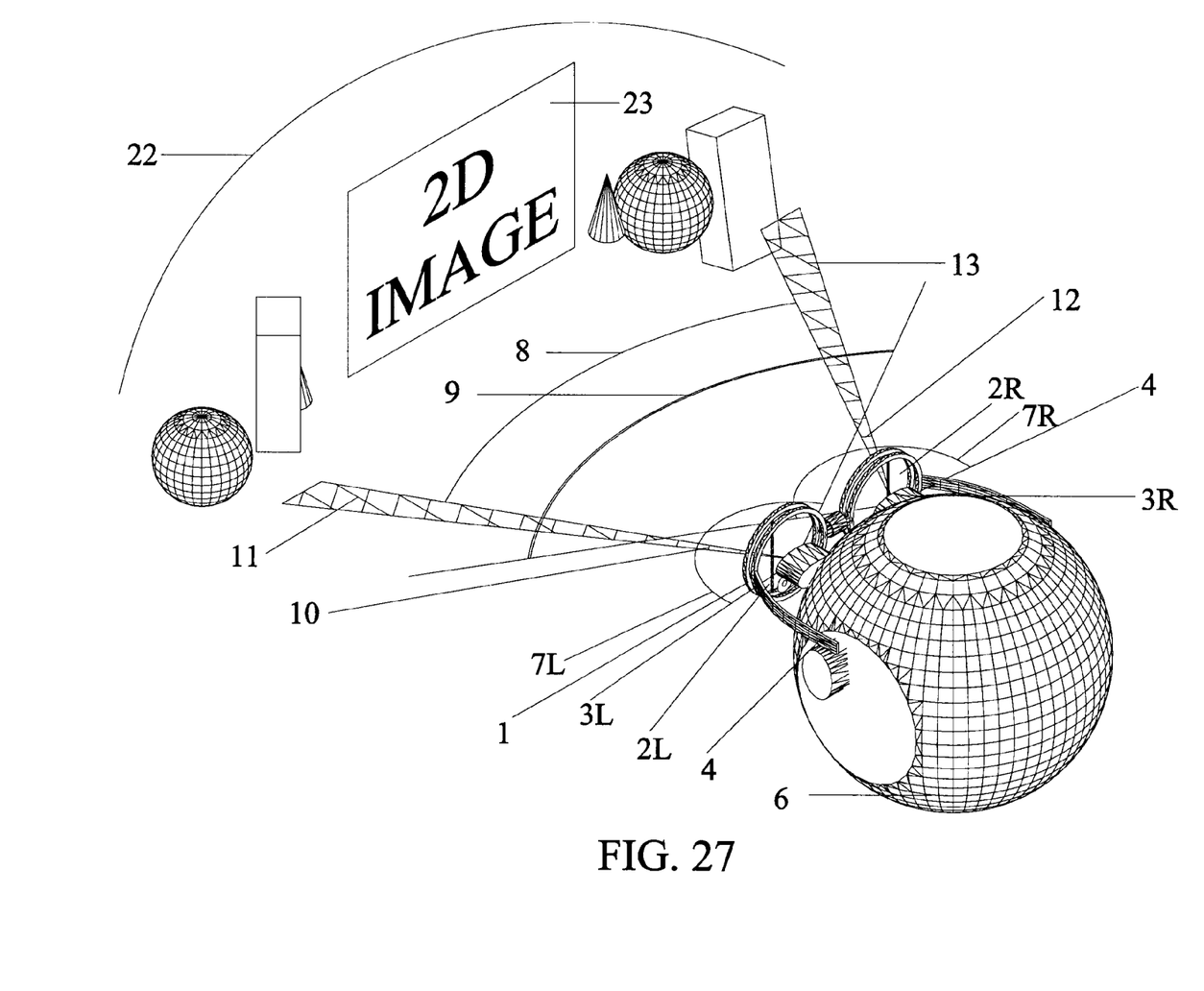
FIG. 27 is a perspective view of the effect on the visual fields of a viewer with the use of the secondary embodiment of the device shown in FIGS. 5-8, 13-16, 18, 20, 23, and 24.
Figure 28:
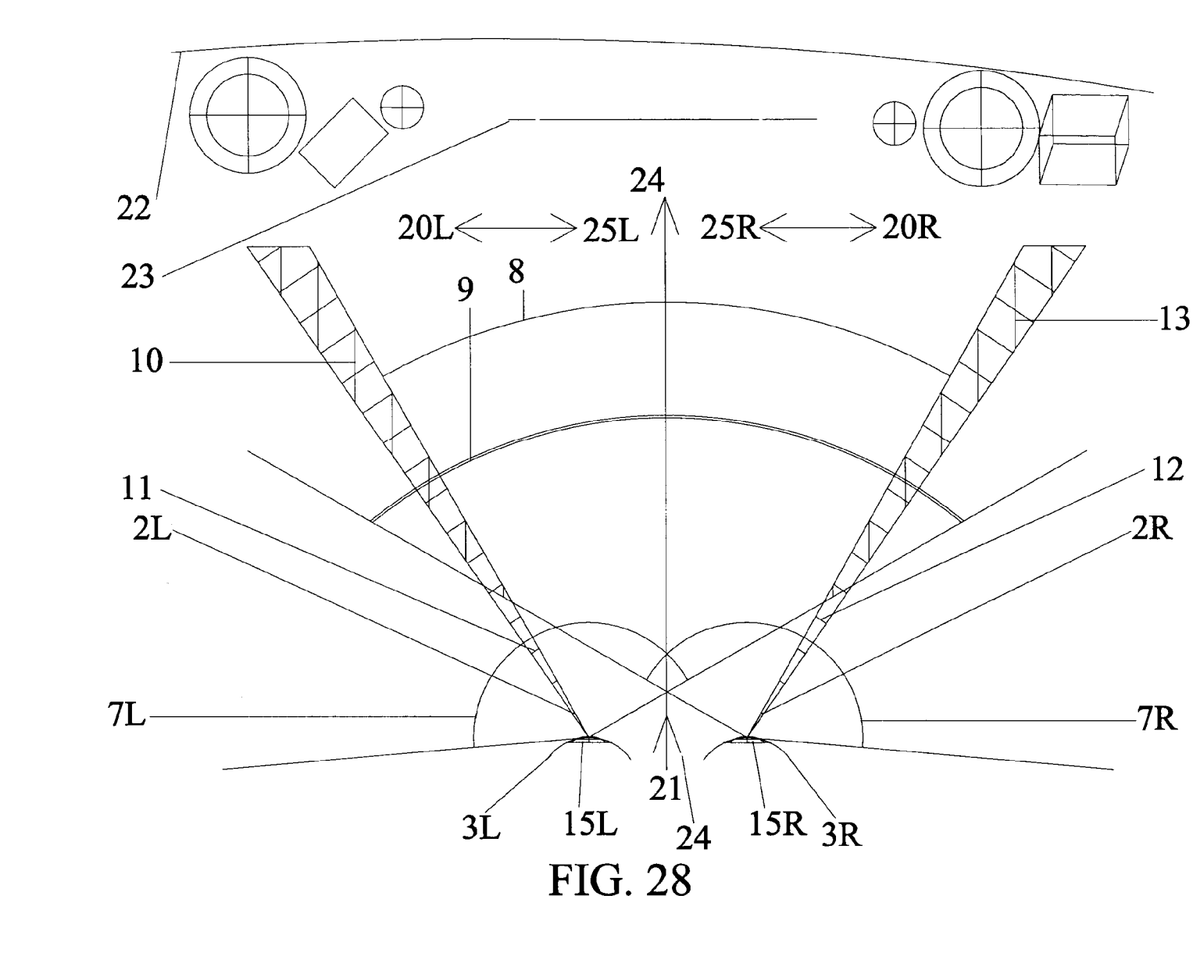
FIG. 28 is a schematic plan (top) view of the effect on the visual fields of a viewer shown in FIG. 27.

Examples of the two ways in which an altered view may be created by the invention are demonstrated with reference to the drawings of the embodiments shown in FIGS. 25-28. (The following discussion of FIGS. 25-28 shall assume that the right eye 3R is the viewer's dominant eye, and that the left eye 3L is the non-dominant eye, and that the suffixes L and R to the reference numbers indicate, respectively, the left and the right of the same numbered figure element.) It is to be understood that the lines illustrating the limits of the visual fields and segments of the visual fields (labeled 7-13) shown in FIGS. 25-28 represent vertically oriented planes which delimit such visual fields and segments in three spatial dimensions, such lines being at the intersections of those vertically oriented planes with the horizontal plane which includes the delimiting lines. Also in consideration of FIGS. 25-28 it is to be understood that the terms "distal" or "distally" shall mean the directions 20L 20R away from mid-line (mid-plane) 21 as shown in FIGS. 26 and 28, and the terms "proximal" or "proximally" shall mean the directions 25L 25R toward that mid-line (mid-plane) 21.

The first and preferred way is shown in FIGS. 25 and 26, which are, respectively, perspective and schematic (top) views of the effect on the visual fields 7L and 7R of a viewer 6 with the use of the preferred embodiment of the invention shown in FIGS. 1-4, 9-12, 17, 19, 21 and 22. In FIGS. 25 and 26 the positioning of an obstructor 2R is in proximity to the front 24 of the dominant eye 3R near the center of the iris 15R of the dominant eye 3R distally 20R from the midline of the head 20. Such positioning obstructs the vision of the dominant eye 3R from the segment 12 (hatched) in the visual field 7R of the dominant eye 3R. However, the segment 13 (cross-hatched), a part of the segment 12 (hatched), remains unobstructed within the visual field 7L of the non-dominant eye 3L, and the non-dominant eye 3L thus has visual information about the physical scene 22 to the right of the midline 21, which is unavailable to the dominant eye 3R. Such additional visual information appears to result in the stimulation of greater attention to the non-dominant eye 3L in the visual cortex and an alteration of eye dominance.

An obstructor may be any device which affects the transmission of light from a physical scene, and may also be opaque, reflective, translucent, clouded, or transparent with reflectivity, color, tint, pattern, distortion, and/or scores; or an image or other effect which is generated by and operates with a configuration of standard electronic and/or optical and/or mechanical components. An obstructor may have any shape; and be positioned by any means, such as by attachment to the viewer, or by suspension in position independent of the viewer, fixedly or adjustably with respect to distance from the viewer's eyes and/or the extent of the obstruction of the viewer's view. An obstructor may also be illuminated, internally or externally, or by refraction or reflection; and such illumination may be fixed or variable in intensity, color, and/or polarization, such variability being controlled with reference to the brightness, color, or otherwise controlled to intensify the enhancement effect and/or accommodate the viewer.

The second way is shown in FIGS. 27 and 28, which are, respectively, perspective and schematic (top) views of the effect on the visual fields 7L and 7R of a viewer 6 with the use of the device shown in FIGS. 5-8, 13-16, 18, 20, 23, and 24, referred to herein as the "secondary embodiment". The positioning of an image element 2L, in proximity to the front 24 of the non-dominant eye 3L near the center of the iris 15L of the non-dominant eye 3L distally 20L from the midline 21 of the head causes the non-dominant eye 3L to have visual information in addition to the physical scene 22 which is not available to the dominant eye 3R. Such additional visual information appears to result in the stimulation of greater attention to the non-dominant eye 3L in the visual cortex. As with the preferred embodiment, such stimulation of the viewer's visual system results in an alteration of eye dominance. The altered view of the physical scene 22 in the viewer's binocular field of view 9 is thus enhanced in the viewer's perception of clarity and depth in the physical scene 22.

Figures 29, 30, 31:
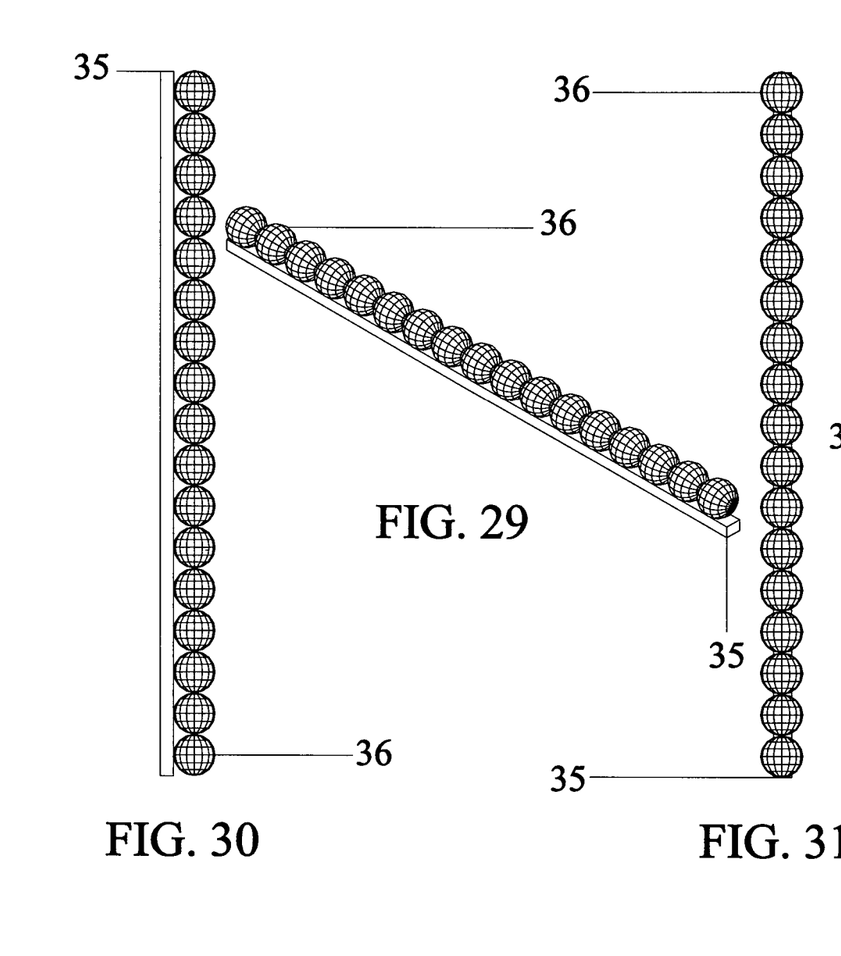
FIG. 29 is a perspective view of a lens focused image element.
FIG. 30 is a side view of a lens focused image element shown in FIG. 29.
FIG. 31 is a front view of a lens focused image element shown in FIG. 29.

Generally speaking an obstructor is usually out of focus when the viewer is focused upon the physical scene because of proximity of the obstructor to the viewer's eye. The preferred positioning for the image element for the secondary embodiment is less in proximity to the surface of the viewer's non-dominant eye, and more in focus for the viewer in viewing a physical scene. An example of an image element that can be more in focus is shown in FIGS. 29-31, being a strip of material 30, the color of which should be easily distinguishable against the background of the physical scene, to which is attached a series of spherical lenses 31 of appropriate index of refraction.

As in the case of an obstructor, an image element may be any device which affects the transmission of light from a physical scene, and may also be opaque, reflective, translucent, clouded, or transparent with reflectivity, color, tint, pattern, distortion, and/or scores; or an image or other effect which is generated by and operates with a configuration of standard electronic and/or optical and/or mechanical components. An image element, however, should be shaped to be visible against the background of the physical scene being viewed; and may be positioned by various means, such as by attachment to the viewer, or by suspension in position independent of the viewer, fixedly or adjustably with respect to distance from the viewer's eyes. An image element may also be illuminated, internally or externally, or by refraction or reflection; and such illumination may be fixed or variable in intensity, color, and/or polarization, such variability being controlled with reference to the brightness, color, or otherwise controlled to intensify the enhancement effect and/or accommodate the viewer.

The preferred way is improved by the obstruction of a segment of the field of view of the non-dominant eye as well. Although it is possible to produce a mild enhancement effect in the preferred way by obstructing the visual field of only the dominant eye as stated, the full enhancement effect seems to be achieved only if the visual fields of both eyes are thus affected. It is not known with certainty why this is the case, but it is thought that if only one eye is affected, eye dominance may be temporarily transferred to the usually non-dominant eye, and the contribution of the usually dominant eye to the binocular view that results in fusion experience is diminished almost to the status of the original contribution of a non-dominant eye to the cyclopean image.

Figure 32:
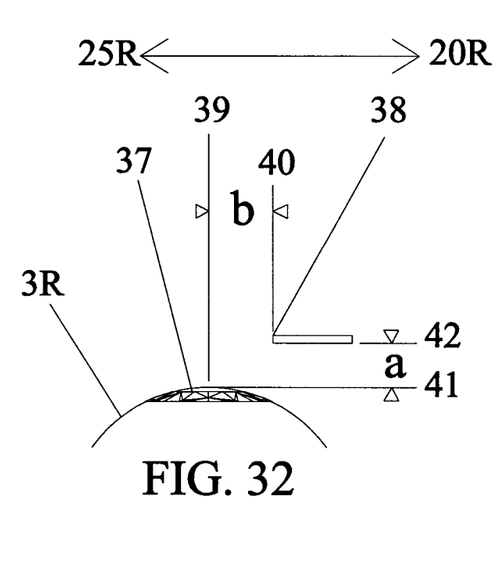
FIG. 32 is a schematic plan (top) view of positioning parameters of an enhancer in relation to a viewer's eye.

Continuing with the assumption that the right eye 3R is the dominant eye, and that therefore the left eye 3L is the non-dominant eye, for both ways the preferred positioning of an enhancer which is an obstructor 2R (2L) may be generally described with reference to FIG. 32. FIG. 32 is oriented to the foregoing assumption, but is also applicable in principle to the location of an enhancer which is an image element 2L in its mirror image (such applicability being indicated herein with the reference number in parenthesis for the non-dominant left eye, such as "(2L)"). The positioning of the enhancer may thus be described as the ratio of a, the perpendicular distance 42 of the enhancer 2R (2L) from the surface 37 41 of the eye 3R (3L) of the viewer, to b, the perpendicular distance 40 of the proximal 25R (25L) edge 38 of the enhancer 2R (2L) from the center 39 of the iris 15R (15L) of the eye 3R (3L) of the viewer. The optimum value of the ratio a/b will vary for individual viewers with respect to their angular width of their natural field of view of their eyes, particularly in the distal direction, and in any event should exceed 0.1. As can be seen from FIG. 32 the perpendicular distances a and b are measured along the lines joining the points of the arrowheads for the respective distances which are perpendicular to the location indicators 42 40 of the enhancer 2R (2L). The positioning of the proximal 25R (25L) edge of the enhancer 2R (2L) for a viewer with normal visual fields is usually satisfactory for all enhancement effects when the distance b is less than one centimeter from the center 39 of the iris 15R (15L) of the eye 3R (3L) and the distance a is less than a centimeter. The enhancement effects intensify as the proximal 25R (25L) edge of the enhancer 2R (2L) is moved closer to the center 39 of the iris 15R (15L) of the eye 3R (3L), accompanied by a consequent decrease in the unobstructed binocular visual field available for the area of interest.

The two ways mentioned may be effected mechanically, electronically, and optically, or by a combination of such means. The currently preferred practice of both ways is to include devices that affect both eyes.

In both ways the altered view within which a 2D image is presented intensifies retinal disparity in the viewer, by reason of the viewer's binocular viewing of the physical scene which includes the 2D image, and is sufficient to cause the viewer to experience the 2D enhancement as well as in the PS enhancement.

In the case of the ordinary viewing of a 2D image (without the use of the present invention) the viewer's attention in the 2D image is probably relaxed, because no significant retinal disparity results from the viewing of a 2D image directly, that is, along a line-of-sight which is substantially perpendicular to the 2D image. Such relaxation in attention appears to decrease the contribution that the retinal image from the non-dominant eye makes to the single cyclopean image (said to be the result of the fusion of the two retinal images in the visual cortex). In the case of the binocular viewing of a 2D image with the present invention, the 2D image is necessarily a part of the physical scene in which it exists. The effect of the greater contribution of the non-dominant eye in the viewer's binocular view of the physical scene, with the consequent intensification of retinal disparity on the Panum's fusional area of the viewer, appears to enhance the experience of fusion for the viewer in the viewer's binocular views of the physical scene with sufficient intensity to include the monocular depth cues in the 2D image in the same experience.

It is likely that the greater contribution by the retinal image of the non-dominant eye carries with it the neural effect of the light stimulus of the rods and cones of the non-dominant eye, thus significantly increasing the number of light stimuli contributing to the cyclopean image with fusion of retinally disparate images in the visual cortex. With such an increase in the number of light stimuli being fused in the visual cortex, the resolution of the cyclopean image in the visual cortex is likely to be increased, and thus the increase in the clarity of the cyclopean image experienced by the viewer, the clarity enhancement effect.

The present invention is intended to be effective to enhance depth perception and/or clarity perception for a viewer who has two eyes and a relatively normal ocular and neural capacity for stereopsis. However, the intensity of the enhancement effect will vary with the level of such capacity in the viewer. Moreover, use of the present invention has revealed differences in depth perception and stereo vision experienced by different persons which are related to certain visual habits and training of those persons. Depth perception in physical scenes is currently considered as being primarily a function of the extent to which a viewer has the capacity to fuse a disparity of binocular retinal images to experience a cyclopean view. However, it appears that this may be but one form of depth perception, the one with which monocular depth cues are learned. This form of depth perception shall hereinafter be referred to as the "fusion form", and persons who have the capacity to such capability referred to as "fusers". It also appears that persons who are inclined to activity that requires spatial tracking, such as sports involving catching, throwing, hitting, watching, and handling various types of game balls, such as baseball, soccer, American football, volleyball, tennis, handball, etc. seem to have less appreciation of monocular depth cues and the form of depth perception to which they are essential. Such persons may not have a sufficiently developed ability to correlate retinal disparity with monocular depth cues, and therefore do not gain sufficient unconscious or automatic visual depth meaning in monocular depth cues. In such persons, depth perception seems to reside in their ability to track and maintain focus on objects of interest, and their accommodation reflex and eye convergence sense are probably highly developed for that purpose. For example, a baseball player at bat must be able to rapidly undergo eye adjustment in order to maintain sufficient focus on the pitched ball in order to track it so as to rapidly predict its motion to hit it with the bat. Likewise a pass receiver in American football must be able to rapidly focus upon and track a pass shortly upon becoming aware of its position in the air. The necessity for such rapidity in tracking precludes the action of retinal disparity to accomplish the purpose, because of the length of time that is necessary for a viewer to sense and appreciate a retinal disparity. The duration threshold for human binocular depth perception in the uninterrupted viewing of binocular depth cues in a physical scene has been found to be as short as three seconds, with other research indicating times as long as six seconds. If the duration threshold is not met by the duration of the physical scene or the viewer's view of or attention to it, the viewer has little if any perception of depth from the fusion of a retinal disparity, and the physical scene is seen by the viewer as essentially two-dimensional. The duration threshold may also be affected by the viewer's capacity for stereopsis, and the viewer's state of consciousness with respect to fatigue or intoxication, factors which have been demonstrated to affect a normal viewer's capacity for stereopsis. The duration threshold for the experience of 2D enhancement is therefore at least as long as that for human depth perception in the viewing of binocular depth cues in a physical scene.

Persons who are visually habituated to tracking as their principal form of depth perception shall be referred to hereinafter as "trackers", and that form of depth perception as "tracking form". The visual habits of a tracker are to be also understood in contrast with the fusion form of depth perception, which requires a viewer to engage in reasonably patient study, although not necessarily conscious, of that which is seen; to see and take in that which is in view over at least a few seconds.

The fusion form of depth perception is not always active in the normal circumstance of viewing physical scenes, even for a fuser, because conscious depth perception in physical scenes is relatively unusual. That is, even a fuser's viewing of physical scenes are usually encountered with insufficient attention and insufficient duration, as previously mentioned. An example of both of these impediments to depth perception in physical scenes is the visual activity in a meeting between two people approaching each other on a sidewalk in an urban setting. They are preoccupied with identification and observation of the other person and maintaining an awareness of their surroundings for traffic, their personal space, obstructions, safety, etc. Such a meeting activity also involves glancing about with eye and head movement to implement awareness, such views usually being of very short duration, rarely more than two seconds, and therefore of insufficient duration to consciously appreciate the effect of retinal disparity. Their conscious visual experience is essentially two-dimensional, aside from eye convergence and the accommodation reflex which is normally constantly operative.

As seen in the literature, considerations of the components of stereoscopic vision and depth perception are concerned with the totality of the experience of depth perception and do not distinguish with respect to certain patterns of human behavior in engaging physical reality with their visual systems. Indeed, most works on depth perception usually distinguish only between binocular depth cues and monocular depth cues, lumping together as binocular depth cues the phenomena of retinal disparity and the motor/sensory aspects of eye convergence/accommodation. However, it is clear that depth perception is a learned aspect of the human visual system, and that monocular depth cues are learned from an individual's experience with fusion of binocular retinally disparate images and eye convergence/accommodation. However, it would appear that the perception of depth learned from eye convergence/accommodation alone would be the least likely candidate for the experience from which monocular depth cues are learned, for the reason that the effect of monocular depth cues themselves require an amount of time for appreciation on a scale with the appreciation of retinal disparity and fusion, and not with the rapid reflex action of the human visual system in tracking with eye convergence/accommodation. This conclusion is consistent with the observation that trackers do not respond as well as fusers to monocular depth cues as significant in representing physical reality, especially where there is no movement associated with such a representation. Moreover, this conclusion is also consistent with the expression by trackers of their ability to see more clearly with the device of the present invention than without it, even though the experience of PS enhancement and 2D enhancement are not significant.

The present invention may also serve as an instrument for the investigation of the phenomena of visual perception, both binocular and monocular, in the study of vision itself, and in diagnostics and treatment of visual disorders. It is believed that the enhancement effect of the present invention plumbs the depths of the currently unknown functions of the visual cortex and the operation of binocular retinal rivalry.

The method for enhancement of visual perception of the present invention, which the device of the present invention is designed to practice, includes alteration of eye dominance of the viewer while maintaining the viewer's binocular view of the viewer's area of attention in the physical scene and/or 2D image. The method may therefore also involve the selection of one or more enhancers, the selection of the mechanical arrangement for positioning of the enhancer, and the positioning of the enhancer. The altered view generated as a result of the alteration of eye dominance thus produces PS enhancement, 2D enhancement, and clarity enhancement.

While the invention has been disclosed in connection with the example of certain embodiments, it will be understood that there is no intention to limit the invention to the particular embodiments shown. This disclosure is intended to cover the general application of the method and systems specifically disclosed and the various alternative and equivalent constructions included within the spirit and scope of the appended claims.

What I claim as my invention is:

1. A device for enhancement of visual perception in a viewer with binocular vision of a physical scene comprising:
   (a) at least one obstructor positioned to the front of and in the visual field of view of the dominant eye of the viewer, distal to the center of the iris of the dominant eye, that obstructs a segment of said visual field that is at least partially in the visual field of view of the non-dominant eye of the viewer, and
   (b) at least one image element positioned in the visual field of view of the non-dominant eye of the viewer, distal to the center of the iris of the non-dominant eye, that is not within the visual field of view of the dominant eye of the viewer;
   so that the viewer's visual system gives greater attention to the retinal image of the viewer's non-dominant eye than when viewed without the device, whereby the viewer's perception of depth and/or perception of clarity in the physical scene is intensified.

2. The device for enhancement of visual perception of claim 1 wherein the proximal edge of said at least one obstructor is within one centimeter of the center of the iris of said at least one eye of the viewer.

3. The device for enhancement of visual perception of claim 1 wherein said at least one obstructor is are positioned within one centimeter to the front of said at least one eye of the viewer.

4. The device for enhancement of visual perception of claim 1 wherein the ratio of (a) the perpendicular distance of said at least one obstructor from the surface of said of at least one of the eyes of the viewer to (b) the distance of the proximal edge of the the obstructor from the center of the iris of said at least one of the eyes of the viewer is greater than 0.1.

5. The device for enhancement of visual perception of claim 1 wherein similar obstructors are similarly positioned to front of both of the eyes of the viewer.

6. The device for enhancement of visual perception of claim 1 wherein said at least one obstructor is incorporated in eyeglasses or mounted in a frame removably attachable to eyeglasses.

7. The device for enhancement of visual perception of claim 1 wherein the position of said at least one obstructor is horizontally adjustable.

8. A device for enhancement of visual perception in a viewer with binocular vision of a physical scene comprising at least one obstructor positioned to the front of and in the visual field of view of the dominant eye of the viewer, distal to the center of the iris of the dominant eye, that obstructs a segment of said visual field that is at least partially in the visual field of view of the non-dominant eye of the viewer; so that the viewer's visual system gives greater attention to the retinal image of the viewer's non-dominant eye than when viewed without the device, whereby the viewer's perception of depth and/or perception of clarity in the physical scene is intensified.

9. The device for enhancement of visual perception of claim 8 wherein the proximal edge of said at least one obstructor is positioned within one centimeter of the center of the iris of the dominant eye of the viewer.

10. The device for enhancement of visual perception of claim 8 wherein said at least one obstructor is positioned within one centimeter to the front of the dominant eye of the viewer.

11. The device for enhancement of visual perception of claim 8 wherein the ratio of (a) the perpendicular distance of an obstructor from the surface of the dominant eye of the viewer to (b) the distance of the proximal edge of the enhancer from the center of the iris of the dominant eye of the viewer is greater than 0.1.

12. The device for enhancement of visual perception of claim 8 wherein similar obstructors are similarly positioned in front of both of the eyes of the viewer.

13. The device for enhancement of visual perception of claim 8 wherein the obstructor is incorporated in eyeglasses or mounted in a frame removably attachable to eyeglasses.

14. The device for enhancement of visual perception of claim 8 wherein the position of the obstructor is horizontally adjustable.

15. A device for enhancement of visual perception in a viewer with binocular vision of a physical scene comprising at least one obstructor positioned to the front of and in the visual field of view of the dominant eye of the viewer, distal to the center of the iris of the dominant eye, that is within the visual field of view of the non-dominant eye of the viewer; wherein the proximal edge of said at least one obstructor is positioned within one centimeter of the center of the iris of the non-dominant eye of the viewer; so that the viewer's visual system gives greater attention to the retinal image of the viewer's non-dominant eye than when viewed without the device, whereby the viewer's perception of depth and/or perception of clarity in the physical scene is intensified.

16. The device for enhancement of visual perception of claim 15, wherein at least one obstructor is positioned within one centimeter to the front of said at least one eye of the viewer.

17. The device for enhancement of visual perception of claim 15 wherein similar obstructors are similarly positioned in front of both of the eyes of the viewer.

18. The device for enhancement of visual perception of claim 15 wherein the obstructor is incorporated in eyeglasses or mounted in a frame removably attachable to eyeglasses.

19. The device for enhancement of visual perception of claim 15 wherein the position of the obstructor is horizontally adjustable.

20. A method for enhancement of visual perception in a viewer with binocular vision of a physical scene comprising the positioning of
  at least one obstructor in the visual field of view of the dominant eye of the viewer, distal to the center of the iris of the dominant eye, that obstructs a segment of said visual field that is at least partially in the visual field of view of the non-dominant eye of the viewer;
  so that the viewer's visual system gives greater attention to the retinal image of the viewer's non-dominant eye than when viewed without the alteration of eye dominance, whereby the viewer's perception of depth and/or perception of clarity in the physical scene is intensified.

* * * * *